(12) United States Patent
Anderson et al.

(10) Patent No.: US 7,651,814 B2
(45) Date of Patent: Jan. 26, 2010

(54) ELECTROCHEMICAL CELL HAVING IMPROVED RADIAL SEAL

(75) Inventors: Thomas P. Anderson, Dodgeville, WI (US); William C. Bushong, Madison, WI (US); Denis D. Carpenter, Verona, WI (US); Aaron J. Rositch, Edgerton, WI (US); Marc L. Syvertsen, Madison, WI (US); Bruce Weldum, Madison, WI (US); Thomas M. Kaufman, Middleton, WI (US)

(73) Assignee: Rovcal, Inc., Madison, WI (US)

( * ) Notice: Subject to any disclaimer, the term of this patent is extended or adjusted under 35 U.S.C. 154(b) by 521 days.

(21) Appl. No.: 10/880,878

(22) Filed: Jun. 30, 2004

(65) Prior Publication Data

US 2005/0064283 A1 Mar. 24, 2005

Related U.S. Application Data

(60) Provisional application No. 60/483,728, filed on Jun. 30, 2003.

(51) Int. Cl.
*H01M 2/08* (2006.01)

(52) U.S. Cl. .......................... 429/175; 429/185

(58) Field of Classification Search ................ 429/174, 429/185
See application file for complete search history.

(56) References Cited

U.S. PATENT DOCUMENTS

| | | | |
|---|---|---|---|
| 4,369,568 A * | 1/1983 | Dopp | 29/623.2 |
| 4,374,909 A * | 2/1983 | Tucholski | 429/174 |
| RE31,413 E | 10/1983 | Jaggard | |
| 5,486,433 A | 1/1996 | Glasser | |
| 5,576,117 A | 11/1996 | Morita et al. | |
| 5,712,058 A | 1/1998 | Malay | |
| 5,800,947 A | 9/1998 | Kohler et al. | |
| 5,846,672 A | 12/1998 | Bennett | |
| 5,945,230 A | 8/1999 | Oltman | |
| 6,033,799 A | 3/2000 | Heinz, Jr. | |
| 6,060,184 A | 5/2000 | Gan et al. | |
| 6,060,194 A | 5/2000 | Linder | |
| 6,066,184 A | 5/2000 | Brenner | |

(Continued)

FOREIGN PATENT DOCUMENTS

EP 1 035 598 A1 9/2000

(Continued)

OTHER PUBLICATIONS

International Search Report from PCT/US2004/021119, dated Apr. 13, 2005.

*Primary Examiner*—Mark Ruthkosky
*Assistant Examiner*—Karie O'Neill
(74) *Attorney, Agent, or Firm*—Armstrong Teasdale LLP

(57) ABSTRACT

An electrochemical cell is provided having a cathode can that fits over an anode can to define an anode cavity for retaining active anode material. A cathode assembly is disposed proximal the base of the anode can, and is separated from the anode cavity via a separator. A radial seal is provided at the remote region between the outer periphery of the anode side wall and cathode side wall to prevent the leakage of electrolyte material. An insulator is disposed between the anode and cathode to provide electrical insulation therebetween.

18 Claims, 4 Drawing Sheets

U.S. PATENT DOCUMENTS 6,245,452 B1    6/2001    Oltman

FOREIGN PATENT DOCUMENTS

| EP | 1035598 A1 * | 9/2000 |
| JP | 58 030066 A | 2/1983 |
| JP | 61 064064 A | 4/1986 |
| JP | 61064064 A * | 4/1986 |
| JP | 63 237350 A | 10/1988 |
| WO | WO 99/63605 A1 | 12/1999 |
| WO | WO 01/69698 A1 | 9/2001 |

* cited by examiner

US 7,651,814 B2

ELECTROCHEMICAL CELL HAVING IMPROVED RADIAL SEAL

CROSS-REFERENCE TO RELATED APPLICATIONS

This claims the benefit of U.S. provisional patent application No. 60/483,728 filed on Jun. 30, 2003, the disclosure of which is hereby incorporated by reference as if set forth in its entirety herein.

STATEMENT REGARDING FEDERALLY SPONSORED RESEARCH OR DEVELOPMENT

Not Applicable.

BACKGROUND OF THE INVENTION

The present invention relates generally to button-size electrochemical cells, and in particular relates to button-size metal-air cells of the zinc-air type having an increased internal volume for active material.

Metal-air cells are used for a variety of applications. A large fraction of such cells are used in hearing aids. Newer versions of such hearing aids are placed inside the outer portion of the human ear, whereby any leakage of material from the cell may come into contact with the skin of the wearer, in the wearer's ear. Accordingly, it is critical that such cells do not leak any of the alkaline electrolyte which is routinely used in such cells.

Furthermore, to the extent that such leakage is detected in the manufacturing process, quality control efforts must be expended to reduce or preferably eliminate such leakage wherever practical. Such quality control efforts, of course, bear associated costs. Therefore, any advance in reducing the leakage of electrolyte is significant to the health of the consumer of such cells, as well as to the commercial value of such cells to the manufacturer.

Furthermore, the overall volume of the cell, useful for containing electrochemically reactive materials, is limited to that space not occupied by non-reactive components of the cell. Thus, to the extent use of internal cell volume by non-reactive components can be controlled or reduced, additional electrochemically reactive material may be used in the cell, and the use life of the cell thereby extended. Accordingly, any effort expended in controlling leakage must be accompanied by a sensitivity to any reduction in the space which is available for use in containing electrochemically reactive materials in the anode can.

One potential source of leakage is the interface between the side walls of the anode can and the cathode can. A seal is therefore traditionally used that is in contact with both side walls and associated sealing fluids, or other materials, in order to successfully provide the necessary seal function. Such frictional engagement with the anode can is routinely obtained using a sliding assembly. However, in such conventional assemblies, the (plastic) seal may be damaged by the anode can. Such damage is difficult to detect, and thus such damaged cells may well leave the manufacturing facility undetected.

One cell overcoming the above-mentioned leakage, while providing controlled doming of the cathode assembly is described in U.S. Pat. No. 5,945,230, the disclosure of which is hereby incorporated by reference as if set forth in its entirety. In particular, referring to FIG. 1, a button-size metal air cell 10 includes an anode can 11 presenting an annular side wall 12 surrounded by a cathode can 13 to define an enclosure 14 filled with an electrolyte and active anode material. A radially compressed gasket 15 (i.e., where the gasket is compressed to a reduced thickness with respect to its free state by forces acting in the radial direction) provides a seal that electrically isolates the anode material from the cathode can 13. The gasket 15 extends substantially along the side wall 12 of the anode can 11 to prevent leakage of electrolyte. A cathode assembly 16 is disposed between the base of gasket 15 and cathode can 13, and a separator 17 layer 61 is disposed at the interface between the anode cathode assembly 16, and permits electrolyte transfer between the anode and cathode while providing electrical isolation therebetween. One or more of air ports 18 extends through the bottom of cathode can 13, thereby providing avenues for the transport of oxygen into the cell adjacent the cathode assembly 16. While the cell thus described is suitable for its intended purpose, the gasket occupies valuable space within the cell that could otherwise be occupied by active material to increase the life of the cell.

What is therefore needed is a cell having a seal that prevents electrolyte leakage while increasing the volume of active material than presently achieved.

BRIEF SUMMARY OF THE INVENTION

The present invention provides a radially compressed seal in a cell that increases active anode volume over conventional designs.

In accordance with one aspect of the invention, an electrochemical cell includes an anode having an anode can, which has a top wall and an annular side wall extending axially downstream therefrom to define an anode cavity. The cell further includes a cathode having a cathode can, which has a bottom wall, and an annular side wall extending axially upstream therefrom past the remote region of the anode side wall. The cathode side wall overlaps the anode side wall such that the anode can is received by the cathode can to enclose the anode cavity. A cathode assembly is disposed adjacent the bottom wall of the cathode can, and a separator is disposed between the cathode and anode cavity. A sealing element is disposed between the cathode side wall and the anode side wall at one end of the cell to prevent leakage of anode material therebetween. An insulating element, separate from the sealing element, extending upstream from the sealing element between the anode can and the cathode can.

The foregoing and other aspects and advantages of the invention will appear from the following description. In the description, reference is made to the accompanying drawings which form a part hereof, and which there is shown by way of illustration, a preferred embodiment of the invention. Such embodiment does not necessarily represent the full scope of the invention, however, and reference must therefore be made to the claims herein for interpreting the scope of the invention.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figures 1, 2A:
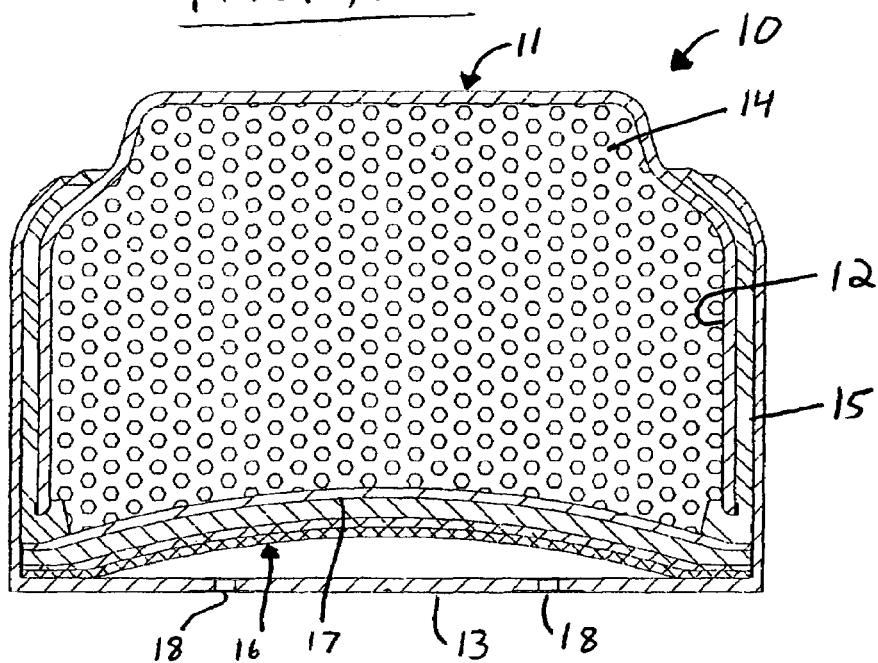
FIG. 1 is a sectional side elevation view of a prior art button cell wherein the seal between anode and cathode extends substantially along the side wall of the anode can.
FIG. 2A is a sectional side elevation view of a button cell constructed in accordance with the preferred embodiment to achieve an increased internal volume.
Figure 2B:
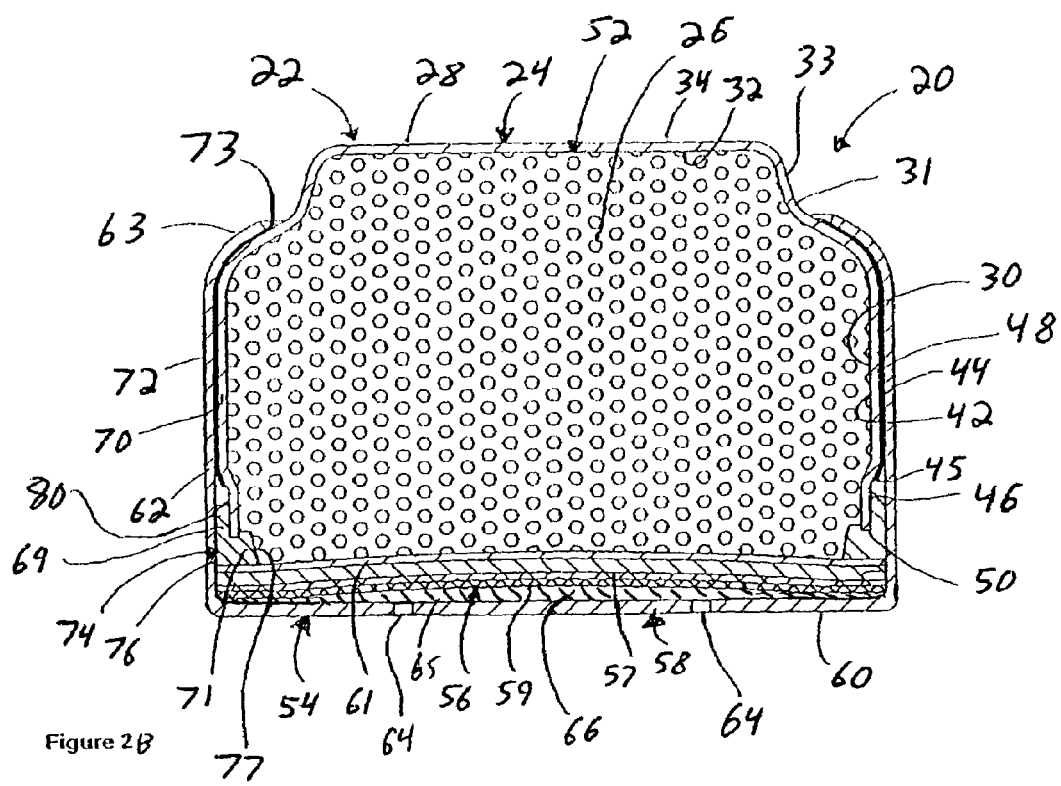
FIG. 2B is a sectional side elevation view of a button cell constructed similar to the button cell illustrated in FIG. 2A, but including a diffusion layer.

Referring to FIG. 2A, an axially extending button-size metal-air cell 20 includes a negative electrode 22 (anode), and corresponding anode can 24 having an alkaline electrolyte with anode material 26 disposed therein. In accordance with the preferred embodiment, the anode can material comprises stainless steel, with a layer of nickel clad on the outer surface, and a layer of copper clad on the inner surface, though it should be easily understood by one having ordinary skill in the art that any well known anode material could be used, such as beryllium copper, stainless steel, copper, nickel, or a combination thereof.

Anode can 24 has a top wall 28, and an annular side wall 30 extending axially downwardly from the periphery of top wall 28. Top wall 28 includes an inner surface 32 that faces anode 26, and an outer surface 34 facing a direction opposite that of inner surface 32. Side wall 30 has a corresponding inner surface 42 and an outer surface 44, and is preferably formed integrally with top wall 28. Top wall 28 and side wall 30 collectively define an open cavity 52 that contains the anode material 26.

The cell further includes a positive electrode (cathode 54), that is defined by a cathode assembly 56, including a cathode mixture and current collector that is contained within a cathode can 58 to enclose cavity 52. In particular, a cathode layer 57 includes a carbon mixture pressed onto a woven nickel screen that is pre-wetted with alkaline electrolyte, as is well known in the art. A pair of Teflon layers 59 is disposed beneath cathode layer 57 to meter the flow of air into the cathode assembly 56 and furthermore to provide a seal between cathode 57 and can 58 that prevents the leakage of electrolyte out of air ports 64 that extend through the bottom wall 60 of cathode can 58. It should be appreciated that one or more layers of Teflon may be provided for this purpose.

A separator layer 61 is disposed at the interface between the anode 22 and cathode 57, and is preferably adhesively attached to cathode 57. Separator 61 permits electrolyte transfer between the anode 22 and cathode 57 while providing electrical isolation therebetween. Separator 61 comprises a non-woven, inert fabric that has sufficient porosity to enable permeability to gas and liquid such as an electrolyte, but substantially solid so as to prevent the cathode from electrically shorting with the anode. While one layer of separator 61 is illustrated, it should be appreciated that multiple separator layers may be included. Alternatively still, the separator may comprise a conformal separator formed from a polymer and an inorganic crosslinking agent that occupies significantly less volume than a conventional fabric, thereby providing greater volume for active material.

Cathode can 58 comprises nickel plated steel in accordance with the preferred embodiment, and includes bottom wall 60 and an annular side wall 62 extending axially upwardly from the outer periphery of bottom 60 and overlapping wide wall 30. Side wall 62 includes an inner surface 70 that faces outer surface 44 of anode can 24 and an outer surface 72 facing a direction opposite that of inner surface 70. A plurality of air ports 64 extend through bottom 60 of the cathode can, thereby providing avenues for the transport of oxygen into the cell adjacent the cathode assembly 56.

The bottom 60 of cathode can 58 curved slightly downwardly away from cathode assembly 56, rather than being completely flat, thereby creating an air reservoir 66 between cathode assembly 56 and bottom 60, which may be accessed by air ports 64. Alternatively, a porous air diffusion layer may fill the air reservoir 66 and, if included, may preferably comprise Teflon. Alternatively, a nonwoven material may be used that enables sufficient air diffusion for cell function, while having sufficient strength to support the cathode assembly 56 and prevent the air reservoir 66 from becoming overly compressed. It should be appreciated that the air diffusion layer, if included, may either be independent of, or integral with, the cathode assembly 56.

Side wall 30 defines a lower remote region 46 at its downstream end relative to top wall 28. An intermediate region 48 is disposed adjacent and above edge region 46. An upper region 31 is disposed at the upper end of wall 30 between top wall 28 and intermediate region 48, and presents a beveled surface 33. Annular side wall 62 defines an upper beveled edge 63 that joins the upper region 48 with top wall 28. Remote region 46 terminates at a distal end 50, which is located at the bottom edge of side wall 30. Side wall 30 presents a beveled edge 45 that joins region 48 to distal end 50, and that displaces remote region 46 radially inwardly from intermediate region 48. Side wall 62 of cathode can 58 extends upwardly from base 60 past the remote region 46 of anode side wall 30 so as to produce an outer shell structure that enables the cell 20 to be inserted into conventional button cell cavities for use. It should be appreciated that the terms "upper" and "lower" are used synonymously with "upstream" and "downstream" such that "upper" defines a direction towards top wall 28, while "lower" defines a direction towards bottom wall 60.

An insulating member 73 is disposed between the inner surface 70 of side wall 62 and outer surface 44 of side wall 30 at the intermediate region 48 and upper region 31 to provide electrical isolation between the anode can 24 and cathode can 58. In particular, insulator 73 is disposed axially upstream of the remote edge region, where the side walls 30 and 62 are in close proximity so as to require electrical isolation. Insulator 73 may comprise any suitable polymeric material or other material well known in the art, such as a propylene, cellulose, paper, waxed paper, or could comprise Teflon that is applied to the outer surface 44 of side wall 30, or inner surface 70 of side wall 62 to form a coating thereon. Insulator 73 has a small thickness to permit an increased volume for active material within container 52 as compared to conventional button cells. To this end, insulator 73 could be a free standing element that installed into cell 20 between anode can 13 and cathode can 58 in the form of a shrink tube or tubular film (e.g., PVC), as would be understood by one having ordinary skill in the art. Alternatively, insulator 73 may comprise a conformal coating of a material such as acrylic, epoxy, or urethane to provide an even smaller thickness, again permitting increased volume for active materials. Such a coating may be cured using visible or infrared light.

The cathode 54 and anode 22 are further electrically isolated from one another via a radially compressed seal (hereinafter also referred to as "radial seal") that is disposed proximal the remote edge region 46. The seal extends substantially along the side wall of the anode can at the remote region 46 to further prevent leakage of electrolyte. The seal is accomplished via an insulating gasket 74 that comprises nylon 6,6 in accordance with the preferred embodiment, but could alternatively comprise other suitable materials that are capable of providing the requisite insulation as well as sealing function, as will be described in more detail below. Examples of such alternative materials include high temperature polypropylenes, such as the type commercially available from Basell USA, Inc., located in Wilmington, Del., that include SD242 (a nucleated, high meltflow, impact modified polypropylene copolymer), SG802N (a high flow, high impact, polypropylene copolymer), and PDC1257 (a polypropylene homopolymer resin). The term "radially compressed" as used with reference to gasket 74 refers to radially compressive forces that are applied to gasket 74 and compress gasket 74 to a reduced radial thickness with respect to its free state.

Figure 3:
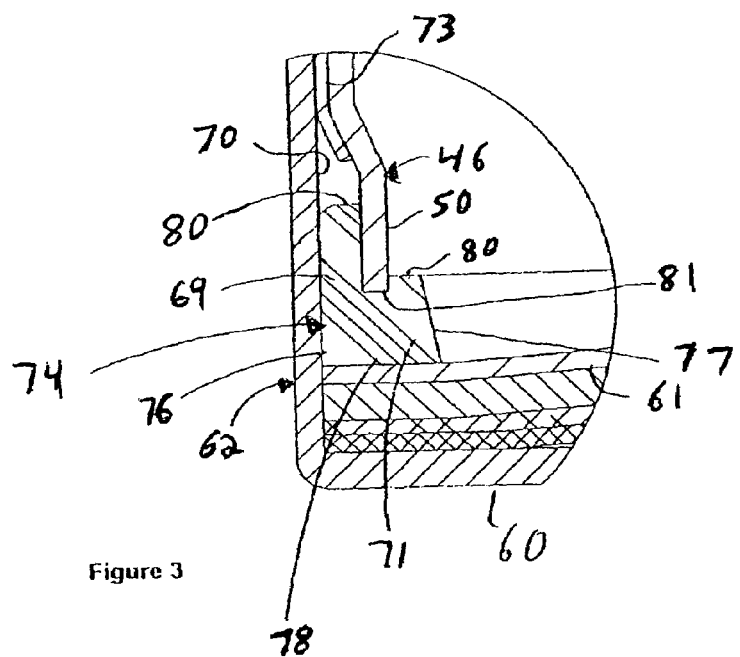
FIG. 3 is a detailed sectional side elevation view of gasket area of the cell illustrated in FIG. 2A.

Referring now also to FIG. 3, gasket 74 includes an axially extending radially outer section 69 defined at its radially outer edge by an outer side wall 76 that extends axially and faces the inner surface 70 of side wall 62 at the remote edge region 46. Outer side wall 76 is compressed radially inwardly between 0.002 and 0.003 inches during installation to provide a tight seal with cathode can 58, as will be described in more detail below. An inner section 71 is disposed radially inwardly with respect to section 69, and is defined at its inner periphery by an inner side wall 77 that extends axially and is disposed radially inwardly with respect to the distal end of side wall 30. The outer section 69 extends axially upwardly a greater amount than inner section 71 to add stability to the gasket 73, and terminates axially downstream of intermediate region 48. A radially extending seal top 80 extends between side walls 76 and 77, and defines the upper surface of gasket 74 at both the inner section 71 and outer section 69. A seal foot 78 defines the base of the gasket 74, and extends between walls 76 and 77, and interfaces with the separator 61.

An annular slot 81 extends axially downwardly into upper surface 80, and downstream of the upper surface 80 of both inner and outer sections 71 and 69, respectively. Slot 81 has a thickness that is sized to snugly receive the distal end 50 of side wall 30 to provide a seal that is formed between gasket 74 and wall 30 that prevents electrolyte from leaking outside cavity 52 at terminal end 50. Electrical isolation is thereby achieved between wall 62 and wall 30, which is separated by outer section 69 of gasket 74. The seal that is formed between gasket 74 and side wall 62 at its radially inner surface 70, prevents electrolyte leakage at this location. It should be appreciated that the radial compression of gasket 74 pinches the distal end of side wall 30 to ensure retention. Advantageously, beveled edge 63 of side wall 62 provides additional support to cathode can 24 to prevent the distal end of side wall 30 from slipping axially out of the slot 81.

In conventional cells side wall 30 would be displaced radially inwardly at a sufficient amount to accommodate the thickness of the gasket between wall 76 and slot 81 at edge regions 31 and 48. However, in the present invention, these portions need only be displaced by the thickness of insulator 73, thereby providing an increased volume 25 for active materials. Advantageously, the position of gasket 74 within cell 20 is fixed due to interference with distal end 50, separator 61, and side wall 62. As a result, side wall 62 need not be crimped at the upper surface 80 of gasket 74, and rather extends past upper surface 80, thereby allowing cell 20 to be manufactured more easily and efficiently than some conventional cells.

It should be appreciated that many variations may be made to the preferred embodiment without departing from the spirit and scope of the invention. For example, side wall 62 could extend only partially axially upwardly with respect to the top wall 80 of gasket 74, thereby providing a reduced interface with wall 30 that requires insulation. Furthermore, if side wall 62 terminates at the upper surface of outer section 69, no insulator 73 would be necessary.

In accordance with an alternate embodiment, the insulation 73 may be replaced by the gasket 74. In particular, the outer section 76 could extend axially upwardly from the gasket body to define a neck disposed between walls 62 and 30. The neck would terminate proximal the termination location of cathode side wall 62. In this embodiment, the neck would have a reduced thickness compared to the thickness of the outer section 76 (approximately 0.001 inches) to enable the internal volume of container 52 to increase with respect to the prior art, thereby extending the life of the cell 20.

Figures 4A, 4B, 4C:
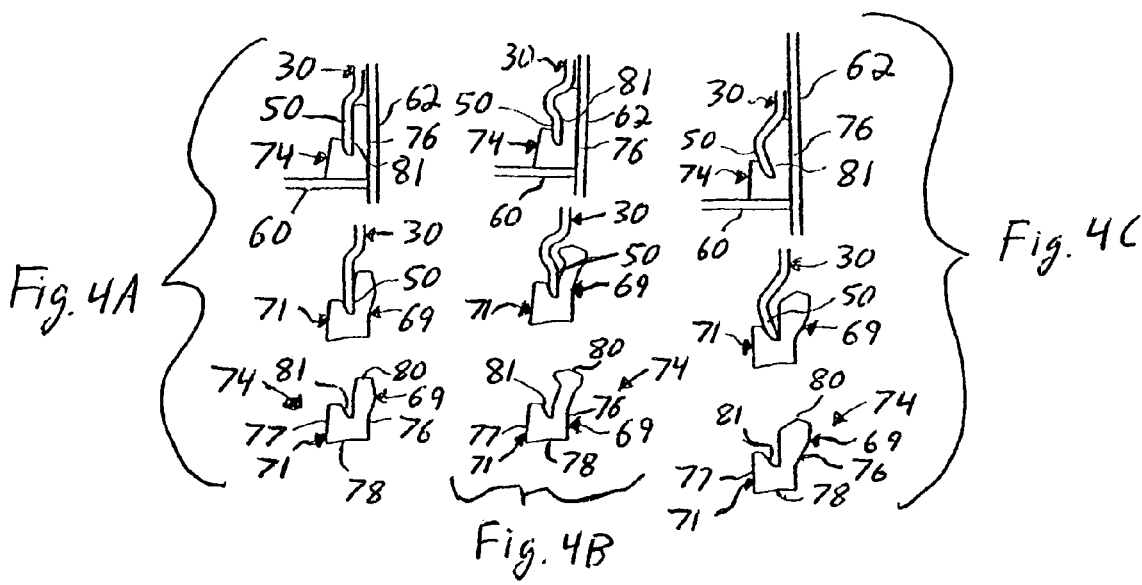
FIG. 4a is a sectional side elevation view of the seal illustrated in FIG. 2A and constructed in accordance with one embodiment of the invention.
FIG. 4b is a sectional side elevation view of the seal illustrated in FIG. 2A and constructed in accordance with an alternate embodiment of the invention.
FIG. 4c is a sectional side elevation view of the seal illustrated in FIG. 2A and constructed in accordance with yet another alternate embodiment of the invention.

Referring now to FIGS. 4a-4c, the gasket 74 is illustrated in accordance with three embodiments of the present invention, it being appreciated that the scope of the invention is not limited to any one of the illustrated embodiments. In each of the illustrated embodiments, outer section 69 is reclined with respect to the axial direction, and has an initial thickness greater than the distance between inner surface 70 and radially outer surface of distal end 50.

During assembly, the distal end 50 of side wall 30 is inserted into slot 81, and the gasket 74 is inserted axially downwardly along the inner surface 70 of side wall 62, such that outer section 69 becomes radially compressed between wall 62 and distal end 50 to provide a tight seal therebetween. The gasket 74 is inserted so as to compress the seal foot 78 against the cathode assembly 56, pressing the cathode assembly against cathode can bottom wall 60 to prevent the electrolyte from leaking therebetween. The distal end 50 of side wall 30 may extend substantially axially into slot 81, as illustrated in FIG. 4a, or may be hooked-shaped as illustrated in FIGS. 4b and 4c to provide a more secure engagement.

Cathode can 58 is next provided having air inlets 64 disposed through bottom wall 60. The cathode assembly 56, which includes the combination of a cathode mixture comprising carbon, manganese dioxide and Teflon in accordance with the preferred embodiment, or any alternative suitable material, and a current collector, is then placed in the can 58. Next, separator 61, which could comprise a non-woven fabric is then placed on top of cathode assembly 56. Alternatively, if separator 61 is a conformal separator, it may be applied directly to the axially outer surface of cathode assembly 56 prior to installation of the cathode. Next, distal end 50 of anode can 24 is inserted into slot 81 of gasket 74, and can 24 is filled with active anode material. Next, the cathode can 58 is fitted over the gasket 74 and side wall 30, and the distal end of side wall 62 is crimped over side wall 30 at upper region 31 to define the cell enclosure. The installation of cathode can 58 radially compresses outer wall 76 of gasket 74. Finally, a tab (not shown) is adhesively attached to the outer surface of cathode can bottom wall 60 so as to prevent the influx of air via inlets 64. The tab is removable to enable operation of the cell 20.

The dimensions of cell 20 will now be described in accordance with the preferred embodiment, it being appreciated that the dimensions and ranges of dimensions below provide a cell having a reliable seal while, at the same time, increasing the volume of anode cavity 52. In one embodiment, where the insulator comprises Teflon, only between 0.001 and 0.004 inches, and more preferably 0.001 and 0.002 inches, separates the outer surface 44 of side wall 30 and inner surface 70 of side wall 62 while providing the requisite electrical isolation therebetween. Alternatively, a conformal liquid may be applied to the outer surface of side wall 30 of anode can 24 at the upper region 31 and intermediate region 48. The liquid subsequently hardens to provide a layer of reliable insulation having a thickness as small as possible while providing a continuous insulating layer. It has been determined that the thickness of the insulation layer can be as low as 0.000001 in. while achieving reliable insulation. The small thickness enables a larger inner diameter of side wall 30, thereby producing approximately a 12% increase in active anode volume with respect to conventional metal-air button cells.

It should thus be appreciated that any insulation thickness less than 0.005 inches (the radial thickness of the gasket when compressed) would provide an increased anode volume with respect to the prior art. More preferably, the thickness of the insulation layer 73 is less than 0.004 inches, and more preferably the thickness of the insulation layer is less than 0.003 inches. The thickness of insulation layer 73 in accordance with the preferred embodiment (in addition to any of the insulating embodiments described herein) is between and including 0.000001 and 0.005 inches, and more preferably between and including 0.000001 and 0.004 inches, and more preferably still between and including 0.000001 and 0.003 inches. Alternatively, the insulating layer 73 may have a thickness between 0.003 and 0.004 inches, between 0.003 and 0.005 inches, or between 0.004 and 0.005 inches.

Figure 5:
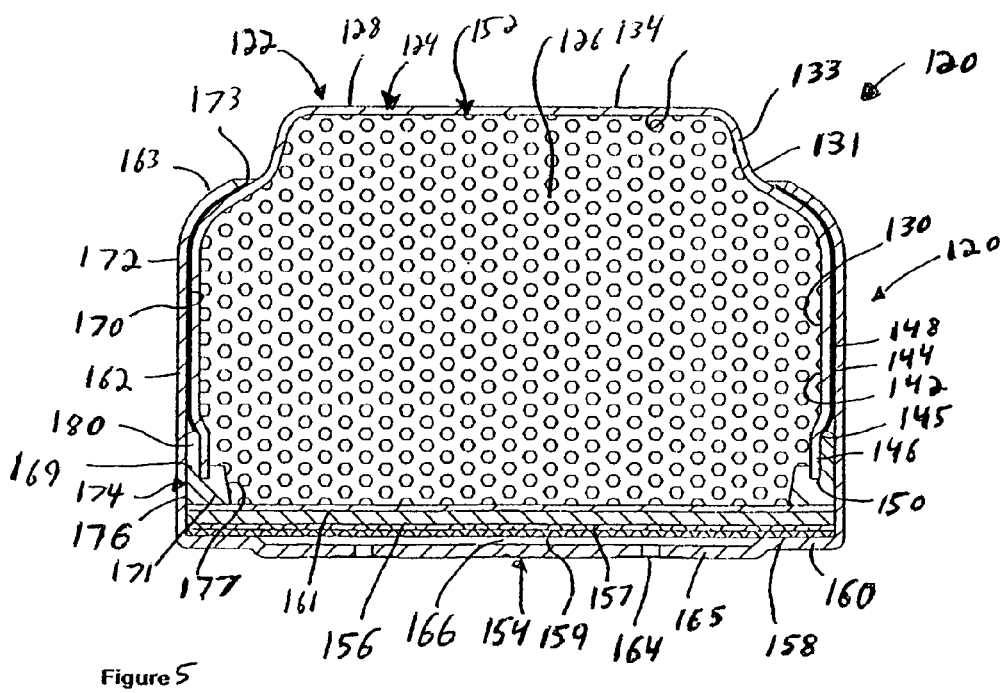
FIG. 5 is a sectional side elevation view of a button cell constructed in accordance with an alternate embodiment of the invention.

Referring now to FIG. 5, a cell 120 is schematically illustrated in accordance with an alternate embodiment, wherein selected reference numerals corresponding to like elements of the previous embodiment have been incremented by 100 for clarity and convenience. In this embodiment a stepped cathode can assembly 154 is used in place of the flat-bottomed cathode can assembly 54. The assembly 154 includes a stepped can 158, having a bottom outer portion 160, and an inner bottom portion 165 disposed radially inwardly of bottom outer portion 160. Inner portion 165 is disposed axially downstream of outer portion 160, creating air reservoir 166 between inner portion 165 and cathode assembly 156. In this embodiment, due to the use of the stepped can 158, the cathode assembly 156 is flat, rather than slightly curved, yet the air reservoir 166 is still provided. Again, air reservoir 166 may alternatively be filled with a porous air diffusion layer. Those features not otherwise described for this embodiment remain similar to those of the preferred embodiment.

Figure 6:
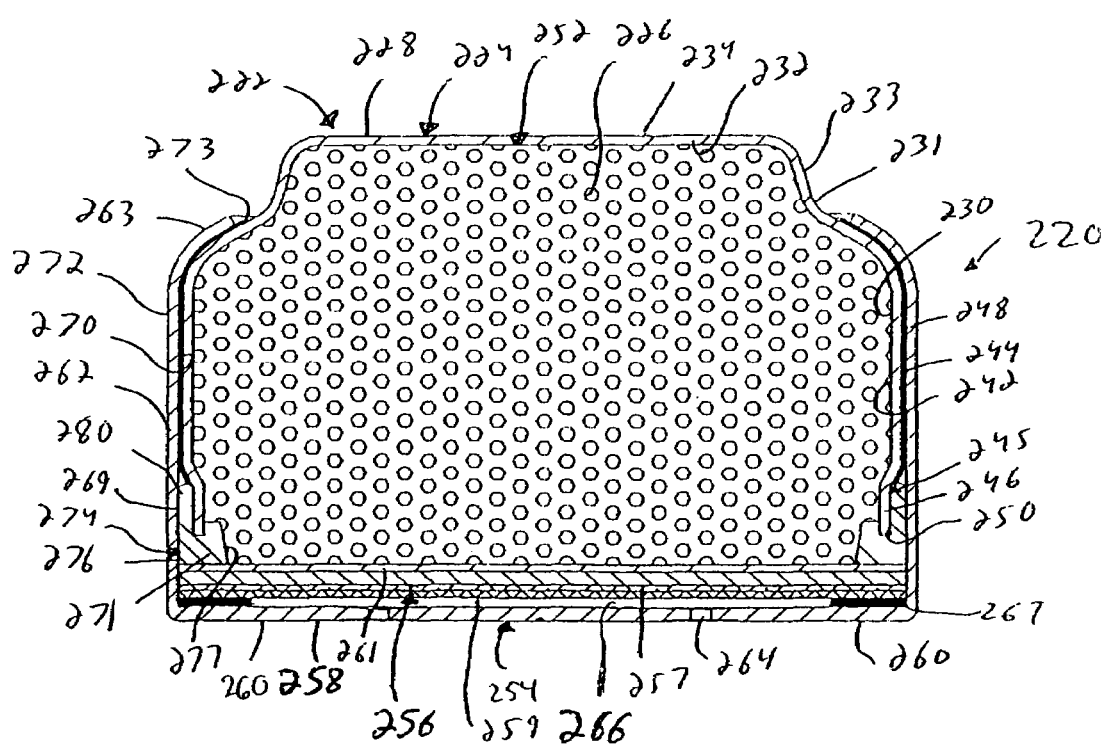
FIG. 6 is a sectional side elevation view of a button cell constructed in accordance with another alternate embodiment of the invention.

Referring now to FIG. 6, a cell 220 is schematically illustrated in accordance with an alternate embodiment, wherein selected reference numerals corresponding to like elements of the previous embodiment have been incremented by 100 for clarity and convenience. In this embodiment, a flat bottomed cathode can assembly 254 is used with an internal step 267, in place of stepped cathode can assembly 154. A flat-bottomed can 258 is used, similar to the flat bottomed can 58 from the preferred embodiment. The internal step 267, which may be comprised of a stiff metal such as nickel plated steel or brass, or a more compressible material such as nylon, polypropylene, or EPDM, is placed in contact with the inner bottom surface of the can 260, at its radially outward edge. As can be observed, the internal step provides much the same internal function as the stepped can, yet allows the cell 220 to retain the same outward appearance to the user as preferred embodiment cell 20. This prevents any problems in mating with the electrical contacts of the hearing aid device in which the cell is used, such as may be possible with the stepped can. Further, the internal step 267, if made of a compressible material, may assist in retaining sealing pressure on the cathode assembly 256 under varying environmental and handling conditions.

The above invention has been that of a preferred embodiment of the present invention. It will occur to those that practice the art, however, that many modifications may be made without departing from the spirit and scope of the invention. In order to apprise the public of the varied embodiments that may fall within the scope of the invention, the following claims are made.

We claim:

1. An electrochemical cell, comprising:
   (a) an anode including:
      i. a single anode can having a top wall and an annular side wall extending axially downstream therefrom to define an anode cavity; and
      ii. an anode material disposed within the anode cavity;
   (b) a cathode including:
      i. a single cathode can having a bottom wall and an annular side wall extending axially upstream therefrom, the cathode side wall overlapping the anode side wall such that the anode can is received by the cathode can to enclose the anode cavity; and
      ii. a cathode assembly disposed adjacent the bottom wall of the cathode can; and
      iii. a separator disposed between the cathode and anode cavity;
   (c) a sealing element disposed between and in contact with the inner surface of the cathode can side wall and the outer surface of the anode can side wall at one end of the cell to prevent leakage of anode material therebetween; and
   (d) an insulating element, separate from the sealing element, extending upstream from the sealing element between and in contact with the outer surface of the anode can side wall and the inner surface of cathode can side wall,
   wherein the anode can side wall terminates at a terminal end, wherein the sealing element comprises a gasket that defines an axially extending slot that receives the terminal end therein, and wherein the sealing element and the insulating element each have a thickness, as measured between the inner surface of the cathode can side wall and the outer surface of the anode can side wall, the thickness of the sealing element being greater than the thickness of the insulating element.

2. The electrochemical cell as recited in claim 1, further comprising an air diffusing member disposed adjacent the bottom wall of the cathode can.

3. The electrochemical cell as recited in claim 2, wherein the diffusing member is integral with the cathode assembly.

4. The electrochemical cell as recited in claim 2, wherein the diffusing member is separate from the cathode assembly.

5. The electrochemical cell as recited in claim 1, wherein the insulating element further comprises a polymeric material.

6. The electrochemical cell as recited in claim 1, wherein the insulating element is a free standing member.

7. The electrochemical cell as recited in claim 1, wherein the insulating element is in the form of a shrink tube or tubular film.

8. The electrochemical cell as recited in claim 1, wherein a portion of the insulating element has a thickness no greater than substantially 0.005 inches.

9. The electrochemical cell as recited in claim 1, wherein the sealing element is radially compressed.

10. The electrochemical cell as recited in claim 1, wherein the cathode can side wall does not extend radially inwardly proximal the sealing element.

11. The electrochemical cell as recited in claim 1, wherein the insulating element has a thickness less than 0.004 inches.

12. The electrochemical cell as recited in claim 11, wherein the insulating element has a thickness less than 0.003 inches.

13. The electrochemical cell as recited in claim 1, wherein the insulating element has a thickness between 0.000001-0.005 inches.

14. The electrochemical cell as recited in claim 1, wherein the insulating element further comprises a coating that is applied to at least one of the outer surface of the anode can and inner surface of the cathode can.

15. The electrochemical cell as recited in claim 14, wherein the coating is conformal.

16. The electrochemical cell as recited in claim 15, wherein the conformal coating comprises a material selected from the group consisting of an acrylic based material and an epoxy based material.

17. The electrochemical cell as recited in claim 15, wherein the material of the insulating element is curable using a visible or ultraviolet light source.

18. The electrochemical cell as recited in claim 1, wherein the insulating element is not in contact with the sealing element.

\* \* \* \* \*

UNITED STATES PATENT AND TRADEMARK OFFICE
CERTIFICATE OF CORRECTION

| | | |
|---|---|---|
| PATENT NO. | : 7,651,814 B2 | Page 1 of 1 |
| APPLICATION NO. | : 10/880878 | |
| DATED | : January 26, 2010 | |
| INVENTOR(S) | : Anderson et al. | |

It is certified that error appears in the above-identified patent and that said Letters Patent is hereby corrected as shown below:

On the Title Page,

Item [*] Notice: Subject to any disclaimer, the term of this patent is extended or adjusted under 35 USC 154(b) by 521 days Delete the phrase "by 521 days" and insert -- by 771 days --

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,651,814 B2 | Page 1 of 1 |
| APPLICATION NO. | : 10/880878 | |
| DATED | : January 26, 2010 | |
| INVENTOR(S) | : Anderson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this
Eleventh Day of January, 2011

David J. Kappos
*Director of the United States Patent and Trademark Office*